United States Patent [19]

Lemercier

[11] 4,284,474
[45] Aug. 18, 1981

[54] STRUCTURES FOR HEAT INSULATION OF SURFACES WITHIN A NUCLEAR REACTOR

[75] Inventor: Guy Lemercier, Le Puy Sainte Reparade, France

[73] Assignee: Commissariat a l'Energie Atomique, France

[21] Appl. No.: 24,574

[22] Filed: Mar. 28, 1979

[30] Foreign Application Priority Data

Apr. 7, 1978 [FR] France .............................. 78 10394

[51] Int. Cl.³ .............................................. G21C 13/08
[52] U.S. Cl. ......................................... 176/38; 176/87
[58] Field of Search .......................... 176/87, 40, 65, 38; 52/404, 410, 506, 508; 85/1.5 R, 1.5 A; 403/406, 407, 408

[56] References Cited

U.S. PATENT DOCUMENTS

| 1,137,433 | 4/1915 | Swartwood | 85/1.5 R |
| 3,920,518 | 11/1975 | Brissaud | 176/87 |
| 3,945,887 | 3/1976 | Lemercier | 176/87 |
| 3,946,165 | 3/1976 | Lemercier | 176/87 |
| 3,979,866 | 9/1976 | Prescott | 52/410 |
| 3,998,024 | 12/1976 | Frandsen | 52/404 |
| 4,022,658 | 5/1977 | Gama | 176/65 |
| 4,028,178 | 6/1977 | Jullien | 176/87 |
| 4,098,040 | 7/1978 | Riefler | 52/404 |

FOREIGN PATENT DOCUMENTS

| 296584 | 2/1954 | Switzerland | 52/404 |
| 2310 | of 1910 | United Kingdom | 85/1.5 R |

Primary Examiner—Stephen C. Bentley
Assistant Examiner—E. F. Miles

[57] ABSTRACT

Each panel of a heat-insulating structure contains a stack of wire fabric elements and is maintained applied against the surface to be protected by means of a double fixing system comprising a tubular member which carries a clamping nut and a bearing plate, said member being rigidly fixed to the surface, and a threaded stud mounted coaxially within the tubular member. The stud carries a nut and a washer for preventing the panel from falling in the event of failure of the tubular member.

5 Claims, 2 Drawing Figures

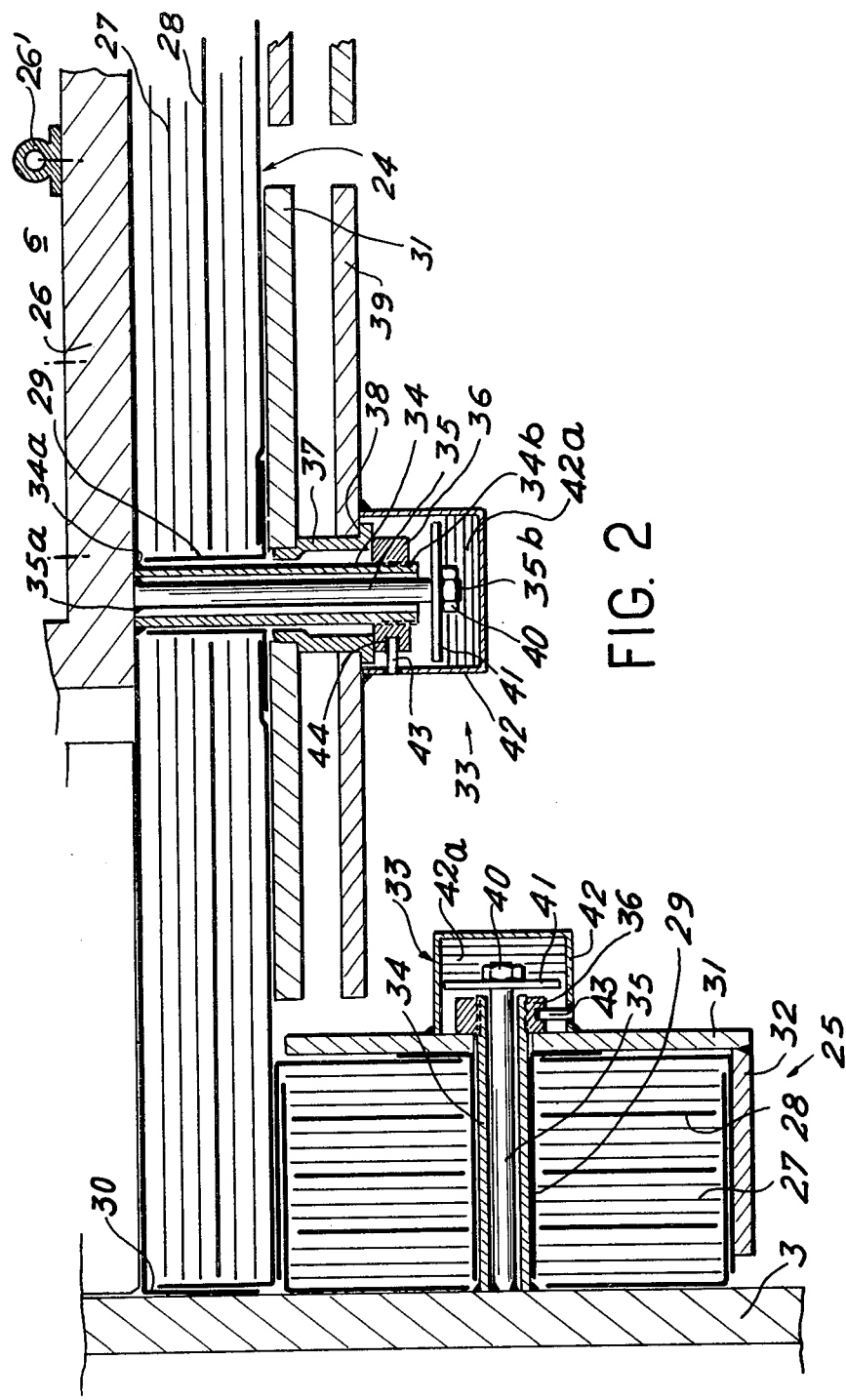

STRUCTURES FOR HEAT INSULATION OF SURFACES WITHIN A NUCLEAR REACTOR

This invention relates to an improvement made in heat-insulating structures employed for protecting certain internal surfaces within a nuclear reactor, especially the underface of the concrete vault roof which closes a fast reactor vessel having a generally cylindrical shape, a vertical axis and a spherical bottom end, the top portion of said vessel being embedded beneath said vault roof. Said reactor vessel contains a predetermined volume of liquid metal usually consisting of sodium and circulated continuously within the vessel in order to cool the reactor core which is immersed beneath the level of said liquid metal.

In one arrangement of this type, the free level of liquid metal within the reactor vessel is located at a given distance from the underface of the vault roof and is in contact with the lateral surface of the vessel only up to the corresponding height whilst the space left free beneath the vault roof is filled with an inert gas usually consisting of argon. During reactor operation, the layer of blanket gas beneath the vault roof is in contact with the hot sodium discharged from the reactor core and receives sodium vapor and aerosols in particular. Thus the lateral surface of the reactor vessel and the metallic sole-plate which usually lines the underface of the concrete vault must be protected against the above-mentioned sodium vapor and aerosols, especially in order to limit the incident heat flux and in order to prevent thermal shocks on the reactor vessel and on the concrete which constitutes the vault roof. In fact, if the thickness of the gas blanket is such as to define a certain thermal gradient, the temperature of the inert gas in the vicinity of the vault roof is incompatible with the mechanical strength of said roof.

In order to provide this kind of protection, there are already a number of different types of heat-insulating structures designed to be applied against surfaces to be insulated against sodium aerosols. In particular, in French Pat. No. 2,235,329 in the name of Commissariat à l'Energie Atomique, it was proposed to form the heat-insulating structure by means of a set of panels each constituted by a stack of wire fabric or metallic trelliswork elements, the entire set of panels being mounted within a semi-leaktight casing which is intended to act as a barrier to sodium aerosols. These panels are applied against the surfaces to be protected and attached to these latter by means of through-studs which are rigidly fixed to the surface and adapted to cooperate at the opposite ends with nuts for applying the panels against the corresponding surface by means of a bearing plate of greater thickness which is applied against the opposite face of said panels.

This invention is directed to an improvement made in a heat-insulating structure of the above-mentioned type which is conducive to a higher degree of operational safety, especially by maintaining the panels against the surfaces to be protected in the event of accidental failure of one or a number of fixing studs.

To this end, the improvement under consideration essentially consists in maintaining each panel containing a stack of wire fabric or metallic trelliswork elements applied against the surface to be protected by means of a double fixing system. This system comprises on the one hand a tubular member which extends through a bore of the panel and the end of which is attached to the surface, the opposite end of said member being threaded and adapted to cooperate with a first nut which applies the panel against the surface by means of a bearing plate. On the other hand, said fixing system comprises a stud mounted in the axis of the tubular member and also attached to said surface, the opposite end of said stud being provided with a threaded head which extends beyond the extremity of the tubular member and cooperates with a second nut which supports a washer for preventing the tubular member and the panel from falling in the event of failure of said tubular member. Provision is made for a protective housing which surrounds the end of the head of the axial stud and is rigidly fixed to said bearing plate, said housing being also rigidly fixed to the first nut.

By virtue of this arrangement, the assembly formed by the panel and its bearing plate falls against the washer in the event of failure of the tubular member, said washer being maintained stationary by the second nut which is mounted on the head of the axial stud.

In one particular embodiment, the first nut is rigidly fixed to the protective housing by providing the lateral surface of this latter with lugs which are each engaged in a slot formed in the first nut in order to maintain the housing in position by means of said lugs in the event of failure of the welded joint of said housing.

In accordance with another distinctive feature which is more especially adapted to panels applied against the bottom surface of the reactor vault roof, the first nut applies the bearing plate against the corresponding panel by means of a sleeve which is coaxial with the tubular member and provided with an annular shoulder for supporting at least one baffle-plate which is parallel to the bearing plate and maintained in position with this latter.

Further distinctive features of a heat-insulating structure which is endowed with the improvements according to the present invention will become apparent from the following description of one example of construction which is given by way of indication without any limitation being implied, reference being made to the accompanying drawings, wherein:

FIG. 2 is a detail view to a larger scale and illustrating the practical design of the structure under consideration.

Figure 1:
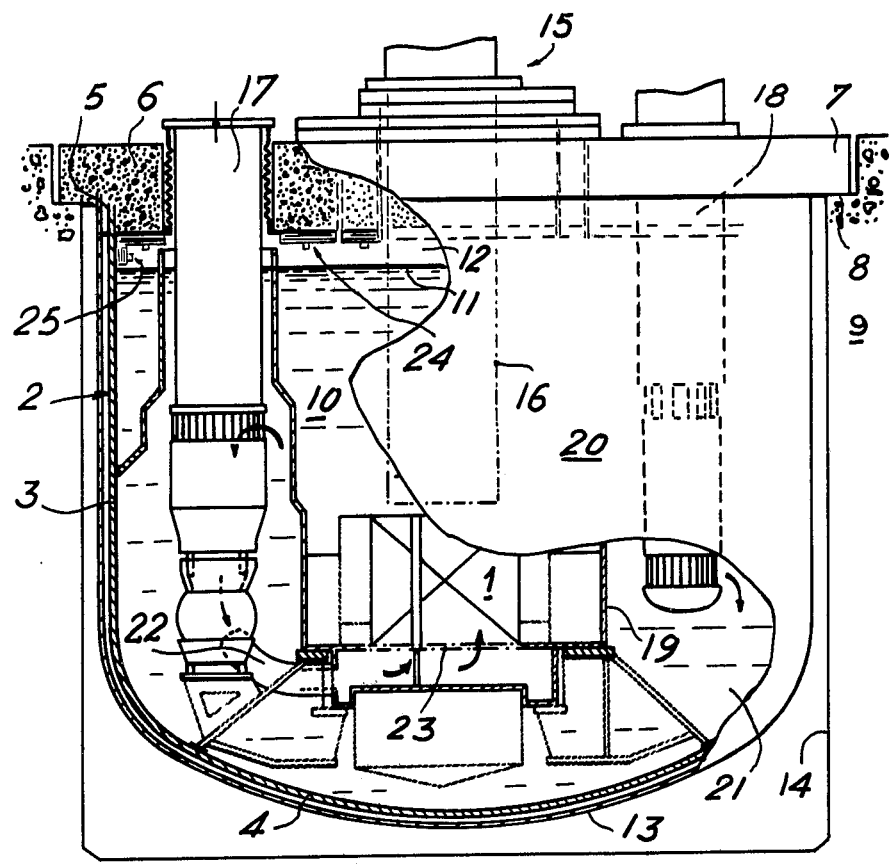
FIG. 1 is a diagrammatic transverse sectional view of a fast reactor which makes use of a heat-insulating structure applied in the region of the inert gas blanket against the upper lateral surface of the reactor vessel and against the underface of the reactor vault roof.

The fast reactor shown diagrammatically in FIG. 1 comprises in a manner which is well-known per se a core 1 mounted within a reactor vessel 2 formed by a cylindrical shell 3 having a vertical axis and a substantially spherical bottom end-wall 4. The open top end 5 of the reactor vessel 2 is embedded in a concrete slab or vault roof 6 of substantial thickness which closes said vessel and has a lateral bearing flange 7. Said flange is applied against a corbel 8 formed in a concrete shield structure or vault 9 which surrounds the reactor and forms the outer reactor containment.

The reactor core 1 is immersed in a suitable volume 10 of liquid metal coolant usually consisting of sodium. The level 11 of coolant within the reactor vessel 2 is located at a predetermined distance from the underface of the reactor vault roof 6, the space 12 thus left free being filled with an inert gas usually consisting of argon. The vessel 2 which contains the sodium 10 is surrounded by an outer vessel 13 which is coaxial with the first and performs the function of a safety vessel, the assembly formed by the two vessels 2 and 13 being mounted within a cavity 14 provided within the interior of the reactor vault 9.

Also in a conventional manner, the reactor vault roof 6 is provided with a system 15 of rotating shield plugs whereby handling and servicing means 16 (shown very diagrammatically in the drawings) are permitted to penetrate into the reactor vessel 2 and to extend to the immediate proximity of the reactor core 1 and immediately above this latter in order to carry out various handling and checking operations within the core during reactor operation. Other orifices are provided within the vault roof 6 on each side of the system 15 for the insertion of components such as pumps 17 and heat exchangers 18, the intended function of which is to collect the sodium discharged from the reactor core in the region 20 which is delimited by an inner vessel 19 mounted within the reactor vessel 2. Said liquid sodium passes first through the heat exchangers 18, releases heat to said exchangers and is cooled, then recovered in the region 21, recirculated by the pumps 17, then returned through large-section ducts 22 beneath a diagrid 23 which is mounted within the vessel 2 and supports the reactor core 1.

In accordance with standard practice, the underface of the reactor vault roof 6 and the upper portion of the cylindrical shell 3 beneath the region in which this latter is embedded in the roof structure are protected by heat-insulating panels designated respectively by the reference numerals 24 and 25, the attachment of the panels to these surfaces being carried out in accordance with the arrangements provided by the invention.

Referring more especially to FIG. 2, the practical construction of the heat-insulating panels 24 and 25 is shown in greater detail. The panels 24 are applied against a metallic sole-plate 26 which lines the underface of the vault roof 6 whilst the panels 25 are applied against the lateral cylindrical shell 3 of the reactor vessel 2. The top face of the metallic sole-plate 26 is fitted with tubes such as the tube 26' in which a coolant fluid is circulated. Preferably, said tubes 26' are each provided with a base-plate which is welded or fixed directly on the metallic sole-plate 26. Said panels are advantageously formed in known manner by juxtaposed elements each constituted by superposed wire fabric or metallic trelliswork elements 27 separated by intercalary sheets 28, the stack thus formed being applied against the surface to be protected. The assembly consisting of juxtaposed panels is surrounded at its periphery by a casing 30. In the case of the reactor vault roof, the panels 24 are applied against the sole-plate 26, the opposite face of said panels being covered by a bearing plate 31. In regard to the panels 25, these latter are applied against the cylindrical shell 3, the bearing plate 31 being preferably extended so as to form a lateral flange-plate 32 at the base of the panels so that these latter may thus be more readily supported in the vertical position.

In accordance with the invention, the heat-insulating panels 24 and 25 are maintained against the surfaces to be protected by means of a composite maintaining unit 33, the constructional detail of which is described below.

In accordance with the invention, each unit is composed of a tubular member 34 and of an axial stud 35 mounted within said tubular member. One end 34a of the tubular member is fixed against the surface to be protected whilst the opposite end 34b has a threaded portion on which is screwed a first nut 36. Said nut is thus intended to be applied either against an annular sleeve 37 which is coaxial with said member or directly against the bearing plate 31. In the first alternative just mentioned, the bearing plate 31 is in contact with the sleeve 37. Said sleeve is advantageously provided with a transverse annular shoulder 38 for supporting a baffle-plate 39 in parallel relation to the bearing plate 31, thus improving the thermal protection of the reactor vault roof. In both cases, the nut 36 maintains the panel locked against the surface during normal operation. It is advantageously ensured that, in order to limit sodium aerosol penetration into the panel at the point at which the tubular member 34 passes through this latter, said member is surrounded by an eyelet 29.

During normal operation, the tubular member 34 also has the effect of compressing the heat-insulating panels against the sole-plate 26 in order to achieve enhanced heat insulation. By way of example, this maximum compression (at the level of the maintaining units 33) is of the order of 70 mb, whereas the mean compression is of the order of 35 mb. By comparison, the pressure resulting from the weight of the panels is only of the order of 1.2 mb.

The axial stud 35 is also fixed by means of its extremity 35a against the surface to be protected and is provided at its opposite end with a head 35b for a second nut 40 which is screwed on the head and supports a washer 41 which extends in a direction parallel to the bearing plate 31. Said second nut 40 and the washer 41 are advantageously surrounded by a protective housing 42 which is secured to the bearing plate 31 or to the baffle-plate 39. Provision is made in the internal lateral surface of said protective housing for three transverse lugs such as the lug 43 which engage in three open slots such as the slot 44 which are formed in the first nut 36. As an advantageous feature, the bottom of the housing 42 can be filled with superposed heat-insulating discs 42a for limiting the heat flux on the head of the stud 35. This accordingly has the effect of eliminating or at least considerably reducing the thermal bridge formed by the fixing stud.

During operation, the heat-insulating panels 24 and 25 are maintained against the corresponding surface to be protected by means of the first nut and the associated tubular member, thereby applying the bearing plate against said surface either directly or through the intermediary of the annular sleeve. In the event of accidental failure of the tubular member, the assembly then falls downwards, this movement being stopped by the washer 41 and the second nut 40 which is screwed on the head of the axial stud. It must be added that the imbrication of the elements which constitute the heat insulation already ensures a certain position-maintenance of the heat-insulating elements even in the event of failure of the maintaining members. On the other hand, the lugs 43 prevent falling of the housing 42 in the event of accidental failure of the welded joint of said housing.

By way of example, it can be mentioned that each heat-insulating panel 24 has a surface area of the order of 1 m$^2$ whereas the bearing plates 31 each have a surface area of 0.25 m$^2$. There are therefore four fixing systems per heat-insulating panel. The heat-insulating layers are disposed in staggered relation. Each panel is constituted, for example, by eight wire fabric elements 27 and each wire fabric element corresponds to a thickness of the order of 8 mm in the compressed state. By way of example, optimum thermal protection is also obtained by employing a protective baffle-plate 39 having a thickness of 6 mm and a bearing plate 31 having a thickness of 6 mm, a space of 20 mm being left between these two plates. As can readily be understood, it would be possible to employ a plurality of superposed baffle-plates in order to increase thermal insulation.

The device for fixing heat-insulating panels in accordance with the foregoing arrangements is capable of maintaining the supported elements in position under all circumstances and of preventing these latter from falling into the reactor vessel with the major disadvantages which would result.

It is readily apparent that the invention is not limited to the example of construction which has been more especially described with reference to the accompanying drawings but extends on the contrary to all alternative forms.

We claim:

1. An improvement to a structure for heat insulation of surfaces within a nuclear reactor, said structure comprising an assembly of panels each formed by a stack of metal fabric elements applied against the surface to be protected by means of a double fixing system comprising a tubular member extending through a bore of a panel having one end attached to the surface, the opposite end of said tubular member being threaded and adapted to cooperate with a first nut which applies the panel against the surface by means of a bearing plate, and a stud mounted in the axis of the tubular member having one end attached to said surface, the opposite end of said stud being provided with a threaded head which extends beyond the extremity of the tubular member and cooperates with a second nut which supports a washer for preventing the tubular member and the panel from falling in the event of failure of said tubular member, and a protective housing surrounding the end of the head of the axial stud, said housing being rigidly fixed to the first nut.

2. An improvement according to claim 1, wherein the bottom of the protective housing is filled with superposed heat-insulating discs.

3. An improvement according to claim 1, wherein the protective housing is provided in its lateral surface with lugs each engaged in a slot formed in the first nut.

4. An improvement according to claim 1, wherein the first nut presses the bearing plate against the corresponding panel by means of a sleeve which is coaxial with the tubular member and has an annular shoulder for supporting at least one baffle-plate which is parallel to the bearing plate and maintained in position with said bearing plate, said protective housing being then rigidly fixed to the baffle-plate.

5. An improvement according to claim 1, wherein the protective housing is rigidly fixed to said bearing plate.

* * * * *